US010942914B2

(12) United States Patent
Swaminathan et al.

(10) Patent No.: US 10,942,914 B2
(45) Date of Patent: Mar. 9, 2021

(54) LATENCY OPTIMIZATION FOR DIGITAL ASSET COMPRESSION

(71) Applicant: ADOBE INC., San Jose, CA (US)

(72) Inventors: Viswanathan Swaminathan, Saratoga, CA (US); Saayan Mitra, San Jose, CA (US)

(73) Assignee: ADOBE INC., San Jose, CA (US)

( * ) Notice: Subject to any disclaimer, the term of this patent is extended or adjusted under 35 U.S.C. 154(b) by 377 days.

(21) Appl. No.: 15/788,146

(22) Filed: Oct. 19, 2017

(65) Prior Publication Data

US 2019/0121883 A1 Apr. 25, 2019

(51) Int. Cl.
*G06F 16/00* (2019.01)
*G06F 16/23* (2019.01)
*G06F 16/583* (2019.01)
*G06F 16/174* (2019.01)

(52) U.S. Cl.
CPC ...... *G06F 16/2365* (2019.01); *G06F 16/1744* (2019.01); *G06F 16/5862* (2019.01)

(58) Field of Classification Search
CPC ............. G06F 16/2365; G06F 16/5862; G06F 16/1744; H03M 7/00; H03M 7/30; H03M 13/00; H03M 13/6312; H04N 19/00; G10L 19/00

See application file for complete search history.

(56) References Cited

U.S. PATENT DOCUMENTS

| | | | |
|---|---|---|---|
| 5,488,365 A | 1/1996 | Seroussi et al. | |
| 5,563,593 A | 10/1996 | Puri | |
| 5,684,865 A * | 11/1997 | Mohtashemi | H04N 1/00281 358/1.9 |
| 5,717,951 A | 2/1998 | Yabumoto | |
| 5,909,693 A | 6/1999 | Martini | |
| 6,378,031 B1 | 4/2002 | Kuno et al. | |
| 6,421,467 B1 | 7/2002 | Mitra | |
| 6,717,990 B1 * | 4/2004 | Abousleman | H03M 7/30 341/200 |
| 6,993,536 B2 | 1/2006 | Yamanaka | |
| 7,009,949 B1 | 3/2006 | Gopalakrishnan et al. | |

(Continued)

OTHER PUBLICATIONS

Zhe-Ming Lu and Zhen Li, "Dynamically restricted codebook-based vector quantisation scheme for mesh geometry compression", pp. 251-260, (Year: 2008).*

(Continued)

*Primary Examiner* — Merilyn P Nguyen
(74) *Attorney, Agent, or Firm* — Shook, Hardy & Bacon L.L.P.

(57) ABSTRACT

Embodiments of the present disclosure provide systems, methods, and computer storage media for mitigating delays typically experienced when training codebooks during the encoding process. Instead of training a codebook based on a single digital asset, multiple digital assets determined to have asset characteristics in common can be grouped together to form a group of digital assets, from which a single codebook can be trained. The group of digital assets together form a codebook training set, such that each digital asset therein can be analyzed, in parallel, to expeditiously train a single codebook. A codebook trained in this manner can be employed to encode other digital assets sharing the asset characteristics as those in the codebook training set.

12 Claims, 4 Drawing Sheets

(56) References Cited

U.S. PATENT DOCUMENTS

| | | | |
|---|---|---|---|
| 7,613,738 B2 | 11/2009 | Patel et al. | |
| 7,630,902 B2* | 12/2009 | You | G10L 19/025 375/240 |
| 7,831,130 B2 | 11/2010 | Takada | |
| 8,185,924 B2 | 5/2012 | Kikkoji et al. | |
| 8,392,705 B2 | 3/2013 | Borden et al. | |
| 9,064,161 B1* | 6/2015 | Boman | G06K 7/01 |
| 9,972,325 B2* | 5/2018 | Gao | G10L 19/12 |
| 2003/0103667 A1 | 6/2003 | Soliman | |
| 2003/0147561 A1* | 8/2003 | Faibish | G06T 9/005 382/245 |
| 2004/0001408 A1 | 1/2004 | Propps et al. | |
| 2004/0174278 A1 | 9/2004 | Kadono et al. | |
| 2005/0071744 A1 | 3/2005 | Dunbar et al. | |
| 2005/0114290 A1 | 5/2005 | Borthakur et al. | |
| 2005/0132161 A1 | 6/2005 | Makela et al. | |
| 2008/0031601 A1 | 2/2008 | Hashimoto et al. | |
| 2010/0138393 A1 | 6/2010 | Crescenti et al. | |
| 2010/0138396 A1 | 6/2010 | Kikkawa | |
| 2011/0006931 A1 | 1/2011 | Sun | |
| 2011/0087768 A1 | 4/2011 | Wu et al. | |
| 2014/0258652 A1 | 9/2014 | Vishniac et al. | |
| 2015/0332690 A1 | 11/2015 | Kim et al. | |
| 2016/0019898 A1* | 1/2016 | Schreiner | G10L 19/02 704/500 |
| 2016/0065961 A1* | 3/2016 | Whillock | H04N 19/94 375/240.22 |
| 2016/0156940 A1* | 6/2016 | Swaminathan | H04N 19/625 375/240.22 |
| 2017/0063392 A1 | 3/2017 | Kalevo et al. | |
| 2017/0155906 A1* | 6/2017 | Puri | H04N 19/122 |

OTHER PUBLICATIONS

Non-Final Office Action dated Sep. 6, 2017 in U.S. Appl. No. 14/964,715, 10 pages.

Blelloch, Guy E., "Introduction to Data Compression," Computer Science Department, Carnegie Mellon University, Jan. 31, 2013. 55 pages.

Blelloch, Guy, "Algorithms in the Real World: Lecture Notes (Fall1997)," Apr. 23, 1998. 303 pages.

Shah Bahram I, et al., "Evaluation of Huffman and Arithmetic Algorithms for Multimedia Compression Standards," Retrieved from the Internet—Nov. 1, 2015. URL: htlp://arxiv.org/flp/arxiv/papers/1109111 09.02.6.pdf. 11 pages.

Wagner, David, "CS 170: Efficient Algorithms and Intractable Problems," Handout 16, UC Berkeley, Apr. 1, 2003. 4 pages.

Non-Final Office Action dated May 29, 2020 in U.S. Appl. No. 15/788,481.

Final Office Action dated Sep. 18, 2020 in U.S. Appl. No. 15/788,481, 10 pages.

Chen, H. N., et al., "Improved Adaptive Vector Quantization Algorithm Using a Hybrid Codebook Data Structure", Real-Time Imaging, pp. 270-281 (2005).

Zhang, C., et al. "Beyond Explicit Codebook Generation: Visual Representation Using Implicitly Transferred Codebooks." IEEE Transactions on Image Processing, vol. 24, No. 12, pp. 5777-5788 (Dec. 2015).

Preinterview First Office Action dated Dec. 14, 2020 in U.S. Appl. No. 15/788,455, 17 pages.

* cited by examiner

LATENCY OPTIMIZATION FOR DIGITAL ASSET COMPRESSION

CROSS-REFERENCE TO RELATED APPLICATIONS

This application is related by subject matter to and has the same priority date as U.S. Non-Provisional Patent Application Ser. No. 15/788,455, entitled "LATENCY MITIGATION FOR ENCODING DATA," and U.S. Non-Provisional Patent Application Ser. No. 15/788,481, entitled "EMBEDDING CODEBOOKS FOR RESOURCE OPTIMIZATION," each assigned or under obligation of assignment to the same entity as this application, the entire digital assets of each being incorporated by reference herein. This application is also related by subject matter to U.S. Pat. No. 9,277,234, filed Aug. 27, 2014, U.S. Pat. No. 9,281,838, filed Feb. 11, 2015, and U.S. Pat. No. 9,591,334, filed Jan. 20, 2016, each entitled "COMMON COPY COMPRESSION" and assigned or under obligation of assignment to the same entity as this application, the entire contents of each being herein incorporated by reference.

BACKGROUND

Consumer access to digital media has progressively moved towards server-based storage solutions, otherwise known as the "cloud." Consumers benefit from having a single access point for storing and accessing digital media because they are no longer required to maintain separate copies of the digital media over multiple devices. Cloud service providers, however, must maintain and distribute the digital media for each licensed consumer. As cloud-based solutions become ubiquitous, so do the complexities of hosting and processing massive amounts of data. More specifically, the intricacies associated with hosting multitudes of digital media copies, while staying within the parameters of copyright laws and digital media licensing requirements, present new and unforeseen technical challenges. More specifically, the processing demands associated with hosting large quantities of digital media can be resource intensive, with processing demands continuously increasing in accordance with the rapidly-increasing numbers and sizes of digital media files. A failure to keep up with the increasing processing demands, such as those associated with encoding and decoding, introduces undesirable strain on cloud-based systems. The described legal and technical challenges together introduces a new array of problems that cloud-service providers need to address effectively.

SUMMARY

Embodiments of the present disclosure relate to codebook generation. More specifically, techniques are disclosed for the optimization of codebook generation latencies when encoding digital media.

In an embodiment, different digital assets that each have a common asset characteristic are obtained in the form of a codebook training set. At least a portion of each digital asset in the codebook training set is processed in parallel to train (i.e., generate) a single codebook. By virtue of processing each digital asset in the codebook training set to train the codebook, the codebook is trained more efficiently, and can be employed immediately to encode any digital asset that also has the common asset characteristic.

In another embodiment, a comparative analysis can be performed on different digital assets to identify a group of digital assets that have a common asset characteristic. Each digital asset in the identified group is defined as a codebook training set, such that each digital asset in the identified group can be processed to more efficiently train a single codebook. In some embodiments, the trained codebook can be immediately employed to encode any digital asset that also has the common asset characteristic.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present disclosure is described in detail below with reference to the attached drawing figures, wherein.

DETAILED DESCRIPTION

Figure 1:
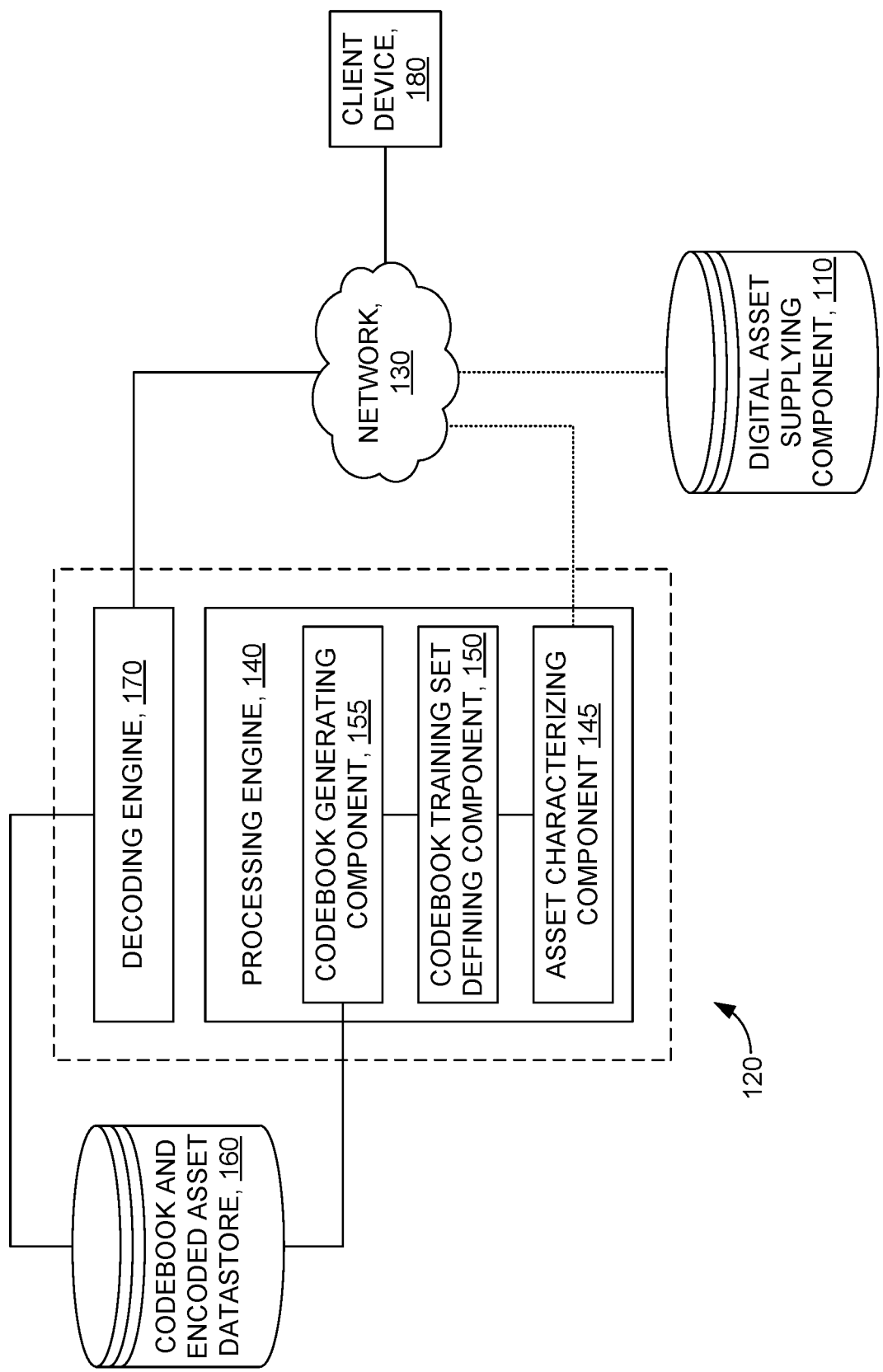
FIG. 1 depicts an exemplary operating environment including a processing engine in accordance with an embodiment of the present disclosure.

As digital data storage moves aggressively toward server-based "cloud" solutions, digital media service providers have harnessed the benefits of cloud-based storage solutions, providing consumers with single point-of-access storage solutions to store and access digital assets. Cloud-based digital media solutions can offer features such as cloud-based television, digital video recording (DVR), movie rental, streaming radio, podcasts, etc., all of which can be provided to multiple users at any given moment. The ever-increasing demand for cloud-based digital asset storage and access results in new technical complexities that service providers must address in efforts to stay ahead of the storage space requirements curve.

Some conventional systems employ specialized compression algorithms, such as vector quantization, which can process (e.g., analyze) a digital asset in such a manner that a codebook is trained based on the digital asset. More specifically, such systems can analyze a digital asset, select various vectors of the digital asset, and map them into a finite set of vectors called a codebook. In this way, compression can be achieved. The trained codebook can later be employed to decode (i.e., reconstruct) the digital asset. The trained codebook can also provide further utility—it can be immediately employed to more efficiently encode additional "substantially similar" copies of the digital asset. Unfortunately, as the digital asset must be first be analyzed, the encoding of additional copies with the codebook is dependent on the duration associated with the codebook training process. The delay incurred during this codebook training period is, in essence, a latency in the overall encoding process. In other words, a delay between a time that the training of a codebook begins and a time that another similar digital asset can be encoded with the trained codebook is undesirable, as the delay can directly impact how quickly digital assets are stored and made accessible by the system.

The conventional codebook training technique was developed based on the natural assumption that a codebook can be effectively trained based on training vectors selected from a single digital asset. As the conventional technique is not optimal for the increased quantity and load on cloud-based media systems, embodiments of the present disclosure provide new techniques that mitigate the delays between the codebook training start time and the encoding (i.e., compression) start time. The described techniques can provide significant optimizations in various encoding and storage applications, such as cloud-based "DVR" solutions, by way of example.

In more detail, embodiments described herein can construct groups of digital assets to effectively train a single codebook. More specifically, multiple digital assets determined to share similar asset characteristics (e.g., content, colors, motion) are grouped together and processed, in parallel, to effectively train a single codebook based thereon. In essence, each digital asset grouped with other digital assets having similar characteristics, can be analyzed in parallel, such that training vectors are selected from all of the grouped digital assets at once. By virtue of having several digital assets, which can be processed and analyzed in unison to train a single codebook, the amount of time required to train the codebook can be reduced by a factor that corresponds to the size of the dataset (e.g., the number of digital assets in the group).

In a practical sense, mitigating latencies associated with the generation of a codebook can facilitate accelerated storage and accessibility of encoded digital assets. The longer it takes for a system to generate a codebook, the longer the system must wait before it can encode another digital asset with the codebook, store the encoded digital asset, and make the encoded digital asset accessible. To illustrate this contrast, assume that a digital asset of interest is a "live" baseball game. Conventional techniques would extract data from the baseball game itself to train a codebook, which would then be utilized to "record" (e.g., encode and store) the game. The delay attributed to a reliance on the asset of interest is undesirable in this context, particularly because recording is generally expected to begin as soon as the "record" instruction is received.

In the "live" context, however, multiple channels can include a wide variety of content, with some channels broadcasting content with relatively similar characteristics. By way of example, each channel in a set of channels may be airing golf-related content at any given time. While some of these channels are broadcasting a golf tournament, others may be broadcasting golf instructional content. In this regard, the content across the set of channels is similar in most regards—green grass, relatively slow camera movements, shots of golf balls in the sky, etc. By identifying similar content characteristics at any given time, a codebook can be quickly trained based on a set of content having similar characteristics. The resulting codebook can then be employed to efficiently encode additional content also sharing the same characteristics, thereby significantly reducing the latencies associated with codebook training when encoding electronic data.

Various terms are used throughout this description. Although more details regarding various terms are provided throughout this description, general definitions of some terms are included below to provider a clearer understanding of the ideas disclosed herein:

As used herein, a "digital asset" generally refers to an electronic data file. In some cases, a digital asset can be a media file or media stream, such as an image, video, and/or audio file or stream. In other cases, a digital asset can be a data file, application, game, or any other digital data file or stream. A digital asset can include presentations (e.g., media) licensed or owned by any number of users. For instance, the digital asset can be a digital recording or stream of a television show or movie.

A digital asset can have any number of "asset characteristics" associated therewith. An asset characteristic of a digital asset can include any characteristic of the digital asset file, the digital asset metadata, or the digital asset content. By way of example only, a digital asset file can have a file name, an extension, or any other identifiable characteristics. In another example, the digital asset metadata can reference content genre, content type (e.g., category, rating), content title, content source (e.g., place of origin), resolution, bitrate, encoding type, encoding source (e.g., software, hardware), entropy coding scheme, compression type, codec, source channel (e.g., streaming source), and the like. Further, the digital asset content can include determinable characteristics, such as a motion vector schema, a discrete cosine transform (DCT) coefficient, additional metadata, and the like. It is contemplated that the digital asset file, metadata, and content can include any one or more of the identifiable or determinable characteristics described above in a non-limiting manner, including those not described herein.

As used herein, "training" a codebook based on data (e.g., a digital asset) is the process of applying a specific code or algorithm to the data for conversion. In some cases, the process of training a codebook can include an encoding process—generating smaller identifiable data pieces from a digital asset. The data pieces can be individually unique (e.g., index files, residual files) and/or commonly used by other data pieces (e.g., a codebook). In other cases, training can include parsing or extracting a common data piece (e.g., a codebook) and a plurality of unique data pieces (e.g., index files, residual files), both the common and unique data pieces being smaller in size than the original digital asset. In some other cases, training can also generate, parse out, or extract a residual data piece for each digital asset.

As used herein, "encoding," also known as compression, refers to the process of modifying or converting the bits structure of data in such a way that it consumes less space on disk. In some cases, compression can be lossless, such that no information is discarded as a result of the compression algorithm used when encoding. In other cases, compression can be lossy, such that the algorithm looks for recurring patterns in a data file and permanently replaces occurrences of the recurring pattern portions with short abbreviations, thereby reducing the file size. When a lossy file is uncompressed, however, only a part of the original information remains. Depending on an acceptable rate of loss, a trade-off must be made between file size and media quality. In various embodiments, a codebook trained from an asset can be employed to encode additional copies of the asset, or in some cases, different assets having similar content characteristics.

As used herein, "compression" refers to the process of modifying, encoding, and/or converting the bit structure of data in such a way that it consumes less space on disk. In some cases, compression can be lossless, such that no information is discarded as a result of the compression algorithm used when encoding. In other cases, compression can be lossy, such that the algorithm can look for recurring patterns in a data file and replace occurrences of the recurring pattern portions with short abbreviations, thereby reducing the file size.

On the other hand, "decoding" is the reverse process of encoding. Decoding converts encoded data back to its original state. In other words, the process of decoding reconstructs a data file (e.g., a digital asset) by merging together smaller identifiable portions (also referred to herein as "reconstructing"). The portions from which the data file is reconstructed can be individually unique and/or commonly used by other portions. In some embodiments, data that was encoded based on a codebook can also be decompressed with reference to the codebook.

A "codebook" generally refers to a set of parameters used to decode data, and in some instances, facilitate the encoding (e.g., compressing) of data. In more detail, the codebook is a collection of parameters, also known as codewords. A codeword refers to a codebook vector determined to be the closest vector in Euclidean distance from the input vector. The codebook can be used to reference the portion of a digital asset that is common to a plurality of index files. As will be described, the codebook can be used with a corresponding index file for decoding and reconstructing the digital asset. However, in some implementations, such as vector quantization by way of example, a codebook can be used for data compression.

As used herein, "extracting" refers to the process of separating portions of data from a plurality of digital assets based on similarities and/or differences between the digital assets. On a very high level, extraction can be performed by comparing each copy to one another to determine the commonalities there between, followed by dissecting the common portions from each copy to determine and generate a common data piece. As such, the remaining portions from each copy remain as the individual data piece. In some other aspects, extraction can be performed by recursive algorithms, which extract and build portions of index files, as digital assets are compared to one another. As such, after recursively traversing through each digital asset, a codebook can be trained as a result of the comparison and extraction process. Other algorithms and processes for generating codebooks and index files are considered within the scope of the present disclosure.

"Vector quantization" is a process of encoding (i.e., compressing) a digital asset into smaller data portions. More particularly, the process encodes a large set of input vectors by finding a smaller set of representative codebook vectors that provide an approximation to the original input space. In some cases, representative codebook vectors can be determined using a nearest neighbor condition, where the encoding region should consist of all vectors that are closer to a particular codebook vector than any other codebook vector. In some other cases, representative codebook vectors can be determined based on a centroid condition, where a particular codebook vector should be the average of all vectors that are in an encoding region. In various embodiments, the determination of representative codebook vectors utilizing the nearest neighbor condition and the centroid conditions can be made in an alternating manner. In some instances, Vector quantization can encode data to compress data into smaller portions (e.g., a codebook and an index file), where a sum of the smaller portions is less than a size of the data prior to encoding.

An "index file" generally refers to a collection of indices for referencing the codebook. In more detail, the index file includes codeword indices that offer the lowest amount of distortion. The index file can be used to represent a single copy of a digital asset. In some implementations, the index file can be used with a codebook to decode and reconstruct the digital as set.

A "residual error" refers to portions of the digital asset input vectors that potentially may not be stored in the codebook as a result of input vector decomposition during vector quantization. In some implementations, residual errors can still be used with a codebook and an index file to decode and reconstruct a digital asset. Residual errors are generally produced as a result of encoding a digital asset using lossy compression schemes, such as vector quantization.

As used herein, "common copy compression" refers to a process of breaking down one or more digital asset data files into a single set of codebooks and individual index files corresponding to the one or more digital asset data files. Both the set of codebooks and the individual index files are smaller than the digital assets from which they were generated. As described herein, a codebook can be shared by multiple index files, whereas the index files are separate data pieces that each represent a different digital asset. In some aspects, a group of digital assets can share a codebook and have a separate index file corresponding to and representing the digital asset. One solution for compressing many digital assets with a single codebook to save storage space, among other things, has been developed by Adobe Systems, Inc., described in U.S. Pat. Nos. 9,727,234, 9,591,334, and 9,281,838, each having the title "Common Copy Compression."

A "compression ratio" generally refers to a value for determining the amount of compression applied to a digital asset. The compression ratio can be a value that is predetermined, input by an administrator, or calculated by a computing device. The compression ratio can affect the size of the codebook and/or index files produced by the common copy compression algorithm. The compression ratio can be a value, percentage, or fraction representative of an amount of compression to-be-performed by the computing device. In various embodiments, compression ratios can change based on a number of codebooks in a training set and/or a number of unique digital assets included in the training set. For example, the compression ratio can be a number on a compression scale of 1 to 10, with 1 being minimal compression resulting in a small codebook with large index files, and 10 being maximum compression resulting in a large codebook with small index files. In one aspect, a small number of unique digital assets in a codebook training set may result in a low compression ratio, while a larger number of such digital assets improves the compression ratio. Compression ratios can also be represented by percentage scales of 0% to 100%, by a fractional scale of 0/1 to 1/1, or any other representative relationship.

As used herein, the "cloud" refers to a wide area network (WAN) commonly depicted as a cloud, often referring to the Internet, and more precisely to a datacenter full of servers connected thereto. In some cases, the cloud can be the Internet, a local area network (LAN), a wide area network (WAN), or any combination thereof.

Turning now to FIG. 1, a schematic depiction is provided illustrating one exemplary operating environment 100 of which an embodiment of the present disclosure can be employed. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The operating environment 100 of FIG. 1 includes a digital asset supplying component 110 that communicates one or more digital assets (not shown) to a server 120 via a network 130. Each digital asset provided by the digital asset supplying component 110 includes respective content (e.g., a television show, a movie, a cartoon) and is associated with a particular avenue through which the content was communicated, such as a television or cable channel, a live broadcast station, a live digital media stream, or other categorized avenue of communicating media. The digital assets are received by the server 120 to be stored, or in essence, recorded in memory for one or more users. By way of example only, a user may have provided the server 120 with a request to record (e.g., DVR) a particular show for the user at a particular time. In this regard, the server 120 will perform an operation to "record" a particular digital asset that corresponds to the particular show, preferably at the designated time.

The server 120 includes a processing engine 140 that can process (e.g., analyze, parse, index, map) a plurality of different digital assets together, as a group, to expedite the generation (i.e., training) of a codebook. By employing an asset characterizing component 145, a codebook training set defining component 150, and a codebook generating component 155, the processing engine 140 can train a codebook based on a plurality of different digital assets, so that the codebook can be quickly employed to encode additional digital assets with similar asset characteristics as those in the group.

The asset characterizing component 145 performs a comparative analysis on each incoming digital asset to determine asset characteristics associated therewith. In other words, the asset characterizing component 145 can analyze each digital asset's content (e.g., vectors), metadata, channel information, and other determinable characteristics to determine a variety of characteristics associated with the digital asset or the content therein. So, if a plurality of digital assets were being provided by a cable television provider, for example, each digital asset may be categorized by genre (e.g., sports, drama, animation, comedy, etc.), or even categorized on a more detailed level, such as sub-genres (e.g., golf, football, black and white films, action films, stand-up comedy, etc.), movement, color schemes, resolution, bitrate, and the like. A more detailed comparison can be performed on the digital assets as well, which can include a comparative analysis on the motion vectors (e.g., motion vector schema) of each digital asset, discrete cosign coefficient(s) (DCT) of each digital asset, and/or the metadata associated with each digital asset, among other things.

When the asset characteristics are determined, the codebook training set defining component 150 defines one or more codebook training sets for the digital assets based on determined common asset characteristics. In other words, by grouping the digital assets together based on the one or more asset characteristics that are determined to be in common, the codebook training set defining component 150 defines a codebook training set for each group of digital assets. To this end, one or more codebook training sets are defined, each including a respective plurality of digital assets that have one or more common asset characteristics.

The codebook generating component 155 of the processing engine 140 then initializes an encoding process on one or more of the defined codebook training sets. That is, for any particular codebook training set, the processing engine 140 begins to process each digital asset of the codebook training set, in parallel with one another, with the purpose of training (e.g., generating) a single codebook in a more efficient manner than when compared to the conventional method of processing a single digital asset.

On a high level, codebook training involves the utilization of a compression algorithm, such as vector quantization, which can take an input vector (e.g., a motion vector) from a digital asset, determine a best representing reproduction vector from a smaller finite dataset, and create a mapping between the input vector and reproduction vector. The collection of mappings results in a reduced (i.e., compressed) dataset that can be reversed with an index to reproduce the digital asset. Naturally, a smaller range of reproduction vectors will result in a reduced size dataset. In this regard, as each digital asset in the codebook training set includes common asset characteristics (e.g., all golf channels displaying a similar range of colors, motion, and tempo), the data of each digital asset can serve as an effective training set to train a single codebook that can later be employed to encode any digital asset having the same asset characteristics as those included in the codebook training set. In this regard, the more similar the digital assets in a codebook training set are, the more efficient the codebook generation process will be. Moreover, by grouping together digital assets have a greater number or range of common asset characteristics, the better the compression ratios for other digital assets having the same asset characteristics may be.

In some aspects, by processing a plurality of digital assets having similar asset characteristics in parallel, a single codebook can be trained at a speed nearly proportional to the number of digital assets in the defined codebook training set. In this regard, and by way of example, if it takes 10 minutes to process enough of a single digital asset to train a codebook and begin encoding another copy of the digital asset, it may take only 1 minute to process enough of 10 digital assets, with common asset characteristics, to train a codebook and begin encoding another digital asset having the same asset characteristics.

The server 120 also includes a codebook and encoded asset datastore 170 that stores the trained codebook and index files for the encoded digital assets. Inheriting the same benefits of the "common copy compression" technique, the codebook and index files consume significantly less storage space than conventional storage techniques that store the digital assets independent of the encoding techniques described herein. Moreover, as noted above, the latency between training of the codebook and employment of the codebook to encode digital assets is reduced, as the time necessary to appropriately "train" enough of the codebook to effectively encode additional assets with common asset characteristics is reduced based at least in part on a number of digital assets in the defined codebook training set.

In some embodiments, the server 120 can include a decoding engine 180 that decodes a particular digital asset in response to a request to provide the asset to a client device, such as client device 180. By way of example, the client device 180 can communicate a request to the server 120 to retrieve a particular "recorded" digital asset associated with an account. The server 120 can employ the decoding engine 180 to retrieve a corresponding codebook and index file that correspond to the requested digital asset. The decoding engine 180 can employ the codebook to decode the index file that corresponds to the requested digital asset, and communicate the decompressed digital asset to the client device 180, preferably via a stream over the network 130.

In some embodiments, the exemplary operating environment illustrated in FIG. 1 can include a plurality of client devices 180 that can request and access digital assets from the server 120 over the network 130. Examples of the network 130 include, but are not limited to, Internet, local area network (LAN), wireless area network, wired area network, wide area network, and the like. A user of a client device 180 can employ various products, applications, or services supported by the client device 180 to facilitate communication to and from the server device 120. Any of these products, applications, or services can be executed directly on the client device 180 and/or accessed via the network 130 (e.g., employing an application remotely accessible by the client device and from the server 120). Examples of the client device includes, but is not limited to, a personal computer (PC), tablet computer, a mobile computer, a smartphone, a desktop computer, a head-mounted display, a processing unit, any combination of these devices, or any other suitable device having one or more processors.

In some embodiments, the digital asset supplying component 110 can include digital assets based on broadcasts, streams, source files, any other media format or real-time media, or any combination of the foregoing. In further embodiments, the digital asset supplying component 110 can include a plurality of digital asset supplying components 110, and any combination of the digital asset supplying components 110 can be coupled to the server 120 via a direct connection or via the network 130.

In some embodiments, the server 120 can provide a "cloud" storage and access service to the client devices 180, and incorporate, among other things, the processing engine 140 to process (e.g., encode, analyze) the hosted digital assets. In further embodiments, the server 120 can also incorporate a decoding engine 180 to decode the hosted digital assets and provide (e.g., stream) the decoded (e.g., decompressed) digital asset to a client device 180 in response to a request to view the digital asset received from the client device 180. In some embodiments, the server 120 can include one or more computing devices (e.g., servers) that can at least analyze a plurality of digital assets having common asset characteristics in parallel (e.g., simultaneously), even if the digital assets have different content, to train a codebook that can be employed quicker than conventional techniques. Although a portion of the description provided herein is generally directed to a processing engine 140 utilizing a compression technique based on vector quantization, it is contemplated that the described systems and methods can also incorporate other types of compression algorithms capable of processing digital assets to generate codebook(s) and index file(s) (and one or more residual files, in some instances) for digital assets.

Figure 2:
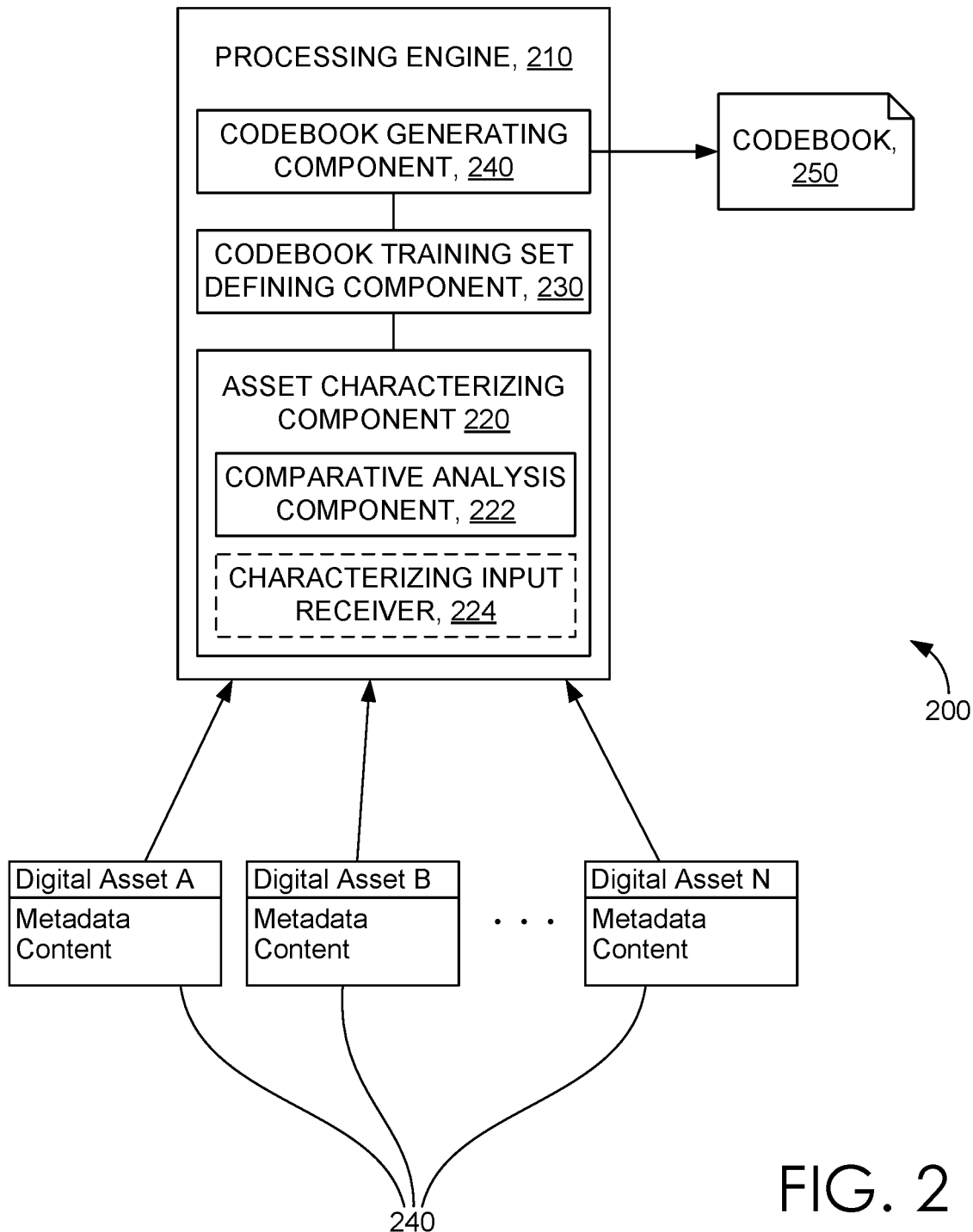
FIG. 2 is a block diagram illustrating an exemplary implementation of the processing engine in accordance with some embodiments of the present disclosure.

Referring now to FIG. 2, a block diagram 200 is provided illustrating a system component in accordance with some embodiments of the present disclosure, for optimizing codebook generation latency to expedite the compression and subsequent storage of digital assets. The block diagram 200 depicts an exemplary implementation of the processing engine 210 in accordance with another embodiment disclosed herein. It is noted that the depicted implementation is merely exemplary, and not intended to be limiting in any way, as each component can be arranged in various configurations, spread across a number of computing devices, combined with other components or one another, arranged to communicate over a network, or any combination of the foregoing including others not mentioned.

As described herein, one or more servers, such as server 120 of FIG. 1, can include a processing engine 210 for optimizing codebook generation latency, which was briefly described herein with reference to processing engine 140 of FIG. 1. As was also described above in reference to FIG. 1, the processing engine 140, 210 can include various components, such as an asset characterizing component 145, 220, a training set defining component 150, 230, and a codebook generating component 155, 240, among other things, that can collectively determine asset characteristics of digital assets (such as digital assets 240), group the digital assets 240 into one or more sets of digital assets based on determined similar or common asset characteristics, define one or more codebook training sets that correspond to the grouped digital assets, and encode the grouped assets to train a codebook (such as codebook 250) for each defined codebook training set. As described herein, the parallel processing of digital assets grouped by similar or common asset characteristics can facilitate an expedited generation of a single codebook, one for each group of digital assets, which can then be employed to encode and compress any digital asset also having similar or common asset characteristics to those in the group.

In some embodiments, the processing engine 210 can obtain a plurality of digital assets 240 that each have metadata and content. In some embodiments, like any electronic data file, each digital asset 240 can have a file name or unique identifier that corresponds to the digital asset. In a further embodiment, the file name or unique identifier can include identifying information, such as a source channel or stream, a content title, an extension, a rating, a genre, or any other characterizing information relating to the asset and/or content included therein. It is contemplated herein that such identifying information can be considered as metadata associated with a digital asset. In some further embodiments, the metadata of each digital asset 240 can include, among other things, a content genre, a content type, a content title, a content source, a resolution, a bitrate, an encoding type, an encoding source, an entropy coding scheme, a compression type, a codec, an associated channel or stream, an asset name, or any combination thereof, not excluding others examples not mentioned.

In some embodiments, the asset characterizing component 220 receives the digital assets 240 to determine the asset characteristics of each digital asset 240. In an embodiment, an inspection of the metadata can be performed to determine whether the digital assets 240 can be grouped by one or more common asset characteristics. By way of example, a first set of digital assets 240 can be determined to include metadata that identifies a particular genre (e.g., football). In this regard, each digital asset having metadata that commonly identifies the particular genre can be grouped together. It is contemplated that each digital asset referencing the particular genre will likely have similar content characteristics (e.g., motion vectors, colors, scene changes, etc.), and thus will facilitate the efficient generation of a codebook that can be employed to effectively compress most or all digital assets also referencing the particular genre. It is also contemplated that any combination of similar content characteristics can be combined when defining requirements for a set of digital assets, and that in some scenarios, the greater number of similar content characteristics required to define the set of digital assets, the more efficient and effective a codebook trained therefrom may be. It is also possible that the inclusion of some content characteristics (e.g., motion vectors) may be more optimal to include as a requirement over other content characteristics, though embodiments described herein do not necessarily limit the combination or selection of content characteristics as a requirement for defining training sets in any way.

In various embodiments, the characterizing of digital assets can be performed automatically, manually, or a combination thereof. In one embodiment, the asset characterizing component 220 can include a comparative analysis component 222 that performs a comparative analysis on the received digital assets 240. In one aspect, the comparative analysis can include an extraction and/or identification of metadata, and a comparison of the metadata associated with each digital asset 240 to determine that those digital assets 240 having common asset characteristics. By way of example only, the comparison of metadata can include a determination of differences between values of a common variable. For instance, each received digital asset 240 can have metadata with one or more variables (e.g., genre, network, content or age rating, cast, etc.). Each of these variables can also be associated with a value (e.g., genre=family; network=Toons Channel; content=G; cast=Bob the Cat). In this regard, a difference operation (e.g., the Linux "diff" command) can be applied to the metadata to identify the digital assets 240 having the most commonalities or, in other words, the lesser quantity of differences. The foregoing implementation is merely an example, and various methodologies for comparing metadata to identify commonalities can be employed within the purview of the present disclosure.

In another aspect, the comparative analysis can include a more content-based analysis and comparison, comparing content characteristics such as motion vectors (i.e., motion schemas), frame relationships, discrete cosine transform (DCT) coefficients, a group of pictures (GOP), a sequence structure, colors, and many other characteristics that can be determined from the content of each digital asset. By way of example only, content characteristics can be determined for a particular digital asset by analyzing the digital asset's frames over time. As a digital asset's frames are analyzed over time, methods such as motion estimation, object segmentation, motion filtering, and the like, can be employed to generate statistical determinations of motion vector distributions and DCT-based confidence maps, among other things. That is, a digital asset can be analyzed frame-by-frame to generate statistics on the aforementioned characteristics. The statistics generated for the digital asset can be compared to statistics generated for other digital assets to determine a likelihood of similarities there between. In this regard, the generated statistical determinations for each digital asset can be compared to that of another digital asset, and those digital assets having the most similar or "least different" statistical determinations can be grouped. In this regard, the comparative analysis can determine those digital assets having similar asset characteristics based on the compared content characteristics as described herein.

In another embodiment, the asset characterizing component 220 can include a characterizing input receiver 224 that can receive (e.g., from a client device) one or more inputs to label or "tag" each digital asset with one or more asset characteristics. By way of example only, a client device in communication with the asset characterizing component 220, assumedly one associated with an administrator user, can view the metadata or content of each digital asset and provide a custom association of asset characteristics for one or more digital assets. Continuing on with the example, the client device can then tag each digital asset with one or more asset characteristics, such that those digital assets having common asset characteristics can later be grouped together. In this regard, the characterizing input receiver 224 can receive one or more inputs from a client device (not shown) and associate one or more asset characteristics to any of the digital assets received by the asset characterizing component 220.

Moving on, the training set defining component 230 can define one or more codebook training sets that each include a set of grouped digital assets, grouped together based on a determination that each digital asset in the group has one or more common asset characteristics. In other words, each codebook training set includes its own group or subset of digital assets from the received plurality of digital assets 240. While it is contemplated that each codebook training set is entirely unique (e.g., no overlap of digital assets), it is possible that some digital assets can be included in multiple codebook training sets, particularly when an asset characteristic associated with those digital assets have a significant weight in a determination to include them into a particular codebook training set.

It is further contemplated that certain asset characteristics may have a greater weight than other asset characteristics during the training set defining process. For instance, if a group of digital assets each include the exact same or similar content, but have different bitrates or resolution, the weight associated with the determination that they each have similar content may weigh heavier in a decision to group them together, in comparison to a determination to separate them into different groups based on their different bitrates or resolution. In this regard, a comparative analysis on motion vectors among the received digital assets 240 can facilitate the identification of similar content. This identification can be employed to group the assets identified as having similar motion vectors into a codebook training set. In this regard, the identified assets can be processed together to train a single codebook for other assets having similar motion vectors as those in the training set. Processes synonymous to, and including the foregoing example, can provide for greater latency optimization than a comparative analysis on metadata, such as genre, in accordance with some embodiments.

Once the codebook training sets are defined by training set defining component 230, the codebook generating component 240 can initialize, for any one of the defined codebook training sets, an analyzing process to train a codebook. In accordance with some embodiments described herein, the codebook generating component 240 employs vector quantization to analyze (i.e., "process") the digital assets and train the codebook.

As can be appreciated by one of ordinary skill in the art, vector quantization in compression applications comprises at least an encoder and a decoder. In simple terms, a digital asset can be broken down into input vectors. For each input vector, the encoder can read the input vector and output the index of the codeword that offers the lowest amount of distortion. In some instances, the lowest distortion is determined by calculating the Euclidean distances between the input vector and each codeword in the codebook. Upon determining the codeword with the smallest Euclidean distance, the index of that codeword is provided for recordation in an index file. The decoder, on the other hand, can read the index file and replace the recorded indices with the associated codeword, thereby rebuilding the input vectors and ultimately reconstructing the digital asset.

In more detail, the method of compression generally begins with an encoder, where each digital asset, such as digital assets 240 are, in essence, the digital asset source files. The source files themselves can be in an uncompressed or a compressed state (e.g., mp4, f4v, mp3, etc.). Each source file is an input file that can be processed within a vectorizer that breaks down the input file into input vectors. Vectorization is well-known in the art of digital media encoding, and additional detail will not be described herein. Utilizing a compression algorithm, such as vector quantization, each input vector is encoded or mapped to a codebook of vectors, such as codebook 250, that results in minimum error. When the input vector is encoded with the codebook, the closest codeword is found and the index of that codeword is utilized to produce parts of an index file. Upon the completion of the encoding process, all input vectors will have been encoded with at least one codebook. The codebook indices, also referred to as the index files, each represent a digital asset. By using the indices of the codebook vectors instead of the input vectors, compression can be achieved. In some instances, the encoding process can produce residual errors. The residual errors can be stored in a single residual file or in separate residual files corresponding to each index file.

In accordance with some embodiments described herein, the processing engine 140 can receive digital assets 240 in either a compressed or uncompressed state. Generally speaking, if the digital assets are communicated in a stream, the digital assets 240 are likely in a compressed state. The codebook generating component 155 can employ any algorithm to process one or more of these digital assets, whether compressed or not, to train a codebook 250. It is contemplated that in some embodiments, it is not necessary to complete the training of a codebook based on the digital assets 240 in a defined codebook training set to begin utilization of the codebook 240. The codebook 250 can be trained while analyzing the input vectors, or in other words "on the fly."

For example, the process of clustering input vectors to different groups based on a distance measure and choosing the centroid of that group as the codebook vector is used to train the codebook 250. However, in some embodiments, when a distance measure is above a certain threshold, a new codebook vector can be added. Moreover, by virtue of analyzing together a plurality of digital assets 240 having common asset characteristics (e.g., by codebook generating component 155), a sufficient portion of the codebook 250 can be trained to effectively employ the codebook 250 for purposes of encoding additional assets also having the common asset characteristics.

By way of an example application, a server device, such as server device 120, may receive a request from a client device, such as client device 180, to record (e.g., DVR) a baseball game that is currently airing live. In conventional practices, the baseball game alone would be processed for a duration to train a codebook up to an appropriate amount before the codebook can be employed to encode and store the television show. However here, by employing the features described herein, the processing engine 210 can immediately begin analyzing a plurality of different channels, such as those replaying classic baseball matchups and highlights, or even a baseball movie for example, to train a codebook up to the appropriate amount, and in a substantially shorter duration than the conventional method described above. By virtue of processing multiple digital assets having common asset characteristics together in parallel, a codebook can be effectively trained and employed to encode similar digital assets with reduced latency. Here, the latency can be reduced because the baseball game itself does not need to be single subject used to train the codebook. Instead, it is a number of similar digital assets that are grouped together to form a corpus, which is used to train the codebook. Moreover, because the corpus includes a plurality of digital assets, the digital assets can contribute a larger amount of training data to train the codebook in a shorter period of time.

Upon the completion of the codebook training process, the codebook can be employed to encode another digital asset having similar characteristics as those utilized to train the codebook. The codebook can be employed to encode the digital asset, such that all input vectors are encoded with at least one codebook and one index file. The index file, also referred to as the codebook index, represents the digital asset. By using indices of codebook vectors instead of the input vectors, compression is achieved. In some instances, the encoding process can produce residual errors. The residual errors can be stored in a single residual file or in separate residual files corresponding to each index file. The trained codebook 250 and encoded assets (i.e., codebook indices) along with any residual files can be stored in a datastore, such as codebook and encoded asset datastore 160 of FIG. 1.

With quick reference back to FIG. 1, the decoding engine 170 can decompress a digital asset for purposes of streaming the digital asset to the client device 180. In an embodiment, the decoding engine 170 decodes the digital asset in response to a request, received from the client device 180, to access or view the digital asset. The decoding engine 170 can essentially reconstruct a digital asset by locating codewords in the trained codebook 250, as defined by an index file. In some embodiments, the decoding engine 170 may utilize any residual files that were produced during the encoding process to facilitate the decoding process. It is contemplated that in some embodiments, the decoding engine 170 can include a reordering component (not shown) that essentially reverses the break down process previously performed by the vectorizer described herein above. Each vector can be reassembled into an original state (e.g., motion vectors, coefficients, etc.) that the digital asset was in, prior to encoding and vectorization. Ultimately, the decoding engine 170 performs the requisite steps to decode the compressed asset into a reconstructed digital asset for distribution to the client device 180.

Figure 3:
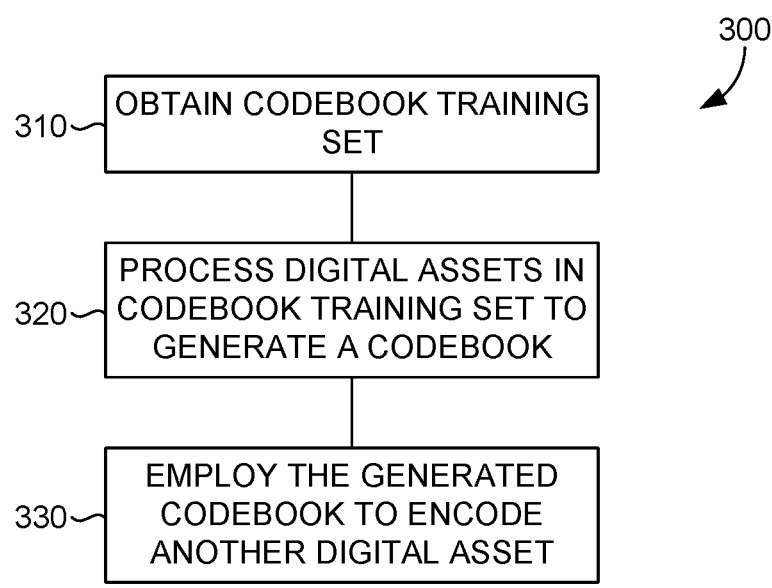
FIG. 3 illustrates a process flow depicting an example method for optimizing codebook generation latencies in accordance with some embodiments of the present disclosure.

Looking now to FIG. 3, a flow diagram is provided showing an example process flow 300 for optimizing codebook generation latencies—by encoding together a plurality of digital assets having common asset characteristic(s) to train a codebook, which can be employed to encode any asset also having the common asset characteristic(s). In FIG. 3, a codebook training set is obtained 310 by a processing engine, such as processing engine 140, 210. As described herein, the codebook training set can include a plurality of digital assets. Each digital asset in the plurality of digital assets has one or more asset characteristics that are in common with one or more asset characteristics of the other digital assets.

In some embodiments, the codebook training set can be defined by a training set defining component, such as training set defining component 150, 230. In some further embodiments, the training set defining component can define the training set based on asset characteristics determined by an asset characterizing component, such as asset characterizing component 145, 220. At least a portion of each digital asset in the plurality of digital assets of the codebook training set is processed 320 by a codebook generating component, such as codebook generating component 155, 240. The processing of the codebook training set includes the training of a single codebook, such as codebook 250 of FIG. 2.

Once the codebook is trained, or at least a sufficient portion of the codebook is trained, the codebook is employed 330 to encode at least a portion of one or more digital assets that also have the at least one common asset characteristic. In some embodiments, the codebook can be employed to encode at least a portion of one of the digital assets in the defined training group. In some other embodiments, the codebook can be employed to encode at least a portion of an entirely different digital asset than one in the defined training group.

In accordance with some embodiments described herein, a comparative analysis can be performed by a comparative analysis component, such as comparative analysis component 222 of FIG. 2, on at least the plurality of digital assets included in the defined codebook training set. In some aspects, the plurality of digital assets can be a subset of a larger plurality of digital assets that are analyzed. The comparative analysis can compare, among other things, motion vector schemata, frame relationships, DCT coefficients, metadata, or any combination thereof, associated with at least a portion of each digital asset in at least the plurality of digital assets. That is, the comparative analysis can compare aspects of the visual and/or audible content included in each digital asset to determine one or more common asset characteristics.

In accordance with another embodiment described herein, in lieu or in combination with the comparative analysis, one or more inputs can be received by a characterizing input receiver from a client device, such as characterizing input receiver 224 of FIG. 2 and client device 180 of FIG. 1. The input(s) can include, among other things, instructions to associate one or more of the digital assets in the defined codebook training set with one or more customized asset characteristics. As described herein, the customized asset characteristics can be associated with any one or more selected digital assets to "tag" or define asset characteristic(s) to the digital assets.

In some further embodiments, the metadata associated with each digital asset can include, among other things, a content, a content genre, a content type, a content title, a content source, a resolution, a bitrate, an encoding type, an encoding source, an entropy coding scheme, a compression type, a codec, a motion vector schema, a group of pictures (GOP), a sequence structure, an associated channel, a frame relationship, an asset name, or any combination thereof. In some embodiments, the content of each digital asset in the defined codebook training set is the same, while the metadata (e.g., bitrate, resolution) of each digital asset is different. In some other embodiments, the content of each digital asset can be different, but portions of the metadata can be the same.

In accordance with some further embodiments described herein, a decoding engine (for instance, decoding engine 170 of FIG. 1) can receive a request from a client device, such as client device 180 of FIG. 1, requesting access to or a viewing of a particular digital asset. In response to receiving the request, the decoding engine 170 can retrieve or receive from a datastore (for instance, codebook and encoded asset datastore 160) the codebook that was trained based on the defined training set, in addition to the encoded digital asset (in other words, the corresponding index file) and any associated residual files, if applicable. The decoding engine 180 can employ the codebook in conjunction with the encoded digital asset, as described herein, to decompress and reconstruct the encoded digital asset. In this way, a server can communicate the uncompressed (i.e., decoded) digital asset to the requesting client device. Also in accordance with some embodiments described herein, it is contemplated that a digital asset can be received by the server system, such as server system 120 of FIG. 1, as an already-compressed digital asset. In this regard, the processing engine 140 can still process the received compressed digital asset to train a codebook based on the compressed digital asset. Moreover, when decoding the twice-compressed digital asset, the latest layer of compression is decompressed, and the compressed digital asset is communicated (e.g., streamed) to the user device, in accordance with some implementations described herein.

Figure 4:
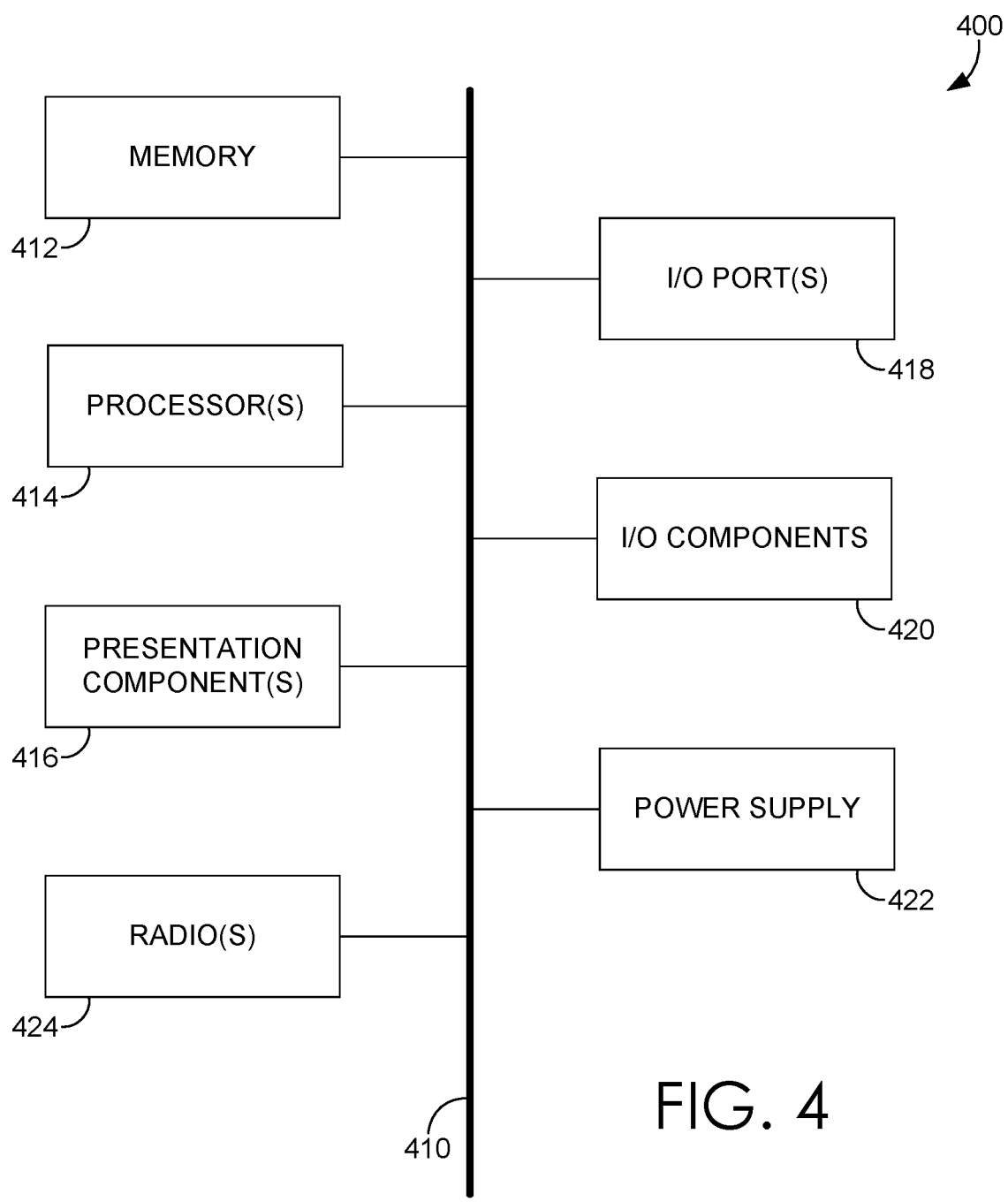
FIG. 4 is a block diagram of an example computing device in which some embodiments of the present disclosure may be employed.

Having described embodiments of the present disclosure, an exemplary operating environment in which embodiments of the present disclosure can be implemented is described below in order to provide a general context for various aspects of the present disclosure. Referring to FIG. 4, an illustrative operating environment for implementing embodiments of the present disclosure is shown and designated generally as computing device 400. Computing device 400 is but one example of a suitable computing environment and is not intended to suggest any limitation as to the scope of use or functionality of the invention. Neither should the computing device 400 be interpreted as having any dependency or requirement relating to any one or combination of components illustrated.

Embodiments of the present disclosure can be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the present disclosure may be practiced in a variety of system configurations, including hand-held devices, consumer electronics, general-purpose computers, more specialty computing devices, etc. Embodiments of the present disclosure may also be practiced in distributed computing environments where tasks are performed by remote-processing devices that are linked through a communications network.

With reference to FIG. 4, computing device 400 includes a bus 410 that directly or indirectly couples the following devices: memory 412, one or more processors 414, one or more presentation components 416, input/output (I/O) ports 418, input/output components 420, and an illustrative power supply 422. Bus 410 represents what may be one or more busses (such as an address bus, data bus, or combination thereof). Although the various blocks of FIG. 4 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 4 is merely illustrative of an exemplary computing device that can be used in connection with one or more embodiments of the present disclosure. Distinction is not made between such categories as "workstation," "server," "laptop," "hand-held device," etc., as all are contemplated within the scope of FIG. 4 and reference to "computing device."

Computing device 400 typically includes a variety of computer-readable media. Computer-readable media can be any available media that can be accessed by computing device 400 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 400. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 412 includes computer-storage media in the form of volatile and/or nonvolatile memory. The memory may be removable, non-removable, or a combination thereof. Exemplary hardware devices include solid-state memory, hard drives, optical-disc drives, etc. Computing device 400 includes one or more processors that read data from various entities such as memory 412 or I/O components 420. Presentation component(s) 416 present data indications to a user or other device. Exemplary presentation components include a display device, speaker, printing component, vibrating component, etc.

I/O ports 418 allow computing device 400 to be logically coupled to other devices including I/O components 420, some of which may be built in. Illustrative components include a microphone, joystick, game pad, satellite dish, scanner, printer, wireless device, etc. The I/O components 420 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 400. The computing device 400 may be equipped with depth cameras, such as stereoscopic camera systems, infrared camera systems, RGB camera systems, touchscreen technology, and combinations of these, for gesture detection and recognition. Additionally, the computing device 400 may be equipped with accelerometers or gyroscopes that enable detection of motion. The output of the accelerometers or gyroscopes may be provided to the display of the computing device 400 to render immersive augmented reality or virtual reality.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A non-transitory computer storage medium storing computer-useable instructions that, when used by one or more computing devices, cause the one or more computing devices to perform operations for optimizing codebook generation latencies, the operations comprising:
obtaining a plurality of digital assets;
training a single codebook with at least a portion of each digital asset in the plurality of digital assets based on a determination that each digital asset in the plurality of digital assets includes a common content and at least one asset characteristic that is different, wherein the at least one asset characteristic includes a bitrate or a resolution; and
employing the trained codebook to encode at least a portion of a first digital asset determined to have the common content and the different at least one asset characteristic.

2. The non-transitory computer storage medium of claim 1, the operations further comprising:
employing the trained single codebook to decode at least an encoded portion of at least the first digital asset.

3. The non-transitory computer storage medium of claim 2, wherein the trained single codebook is employed to decode at least the encoded portion of at least the first digital asset based at least in part on a received request to access the first digital asset.

4. The non-transitory computer storage medium of claim 2, wherein the plurality of digital assets is obtained based on the determination that each digital asset in the plurality of digital assets includes the common content and the at least one asset characteristic that is different.

5. A computerized system for optimizing codebook generation latencies, the system comprising:
a processor; and
computer-storage media storing computer-useable instructions that, when used by the processor, cause the processor to:
obtain a codebook training set that includes a plurality of digital assets;
based on a determination that each digital asset in the codebook training set has a content and at least one asset characteristic that is different, train a single codebook by mapping, from at least a portion of each digital asset in the codebook training set, at least one vector to a corresponding portion of the single codebook, wherein the at least one asset characteristic includes a bitrate or a resolution; and
employ the trained single codebook to encode at least a first digital asset having the content.

6. The computerized system of claim 5, wherein the instructions further cause the processor to:
employ the trained single codebook to decode at least an encoded portion of at least the first digital asset.

7. The computerized system of claim 6, wherein the instructions further cause the processor to:
employ the trained single codebook to decode at least the encoded portion of at least the first digital asset based at least in part on a received request to access the first digital asset.

8. The computerized system of claim 5, wherein the codebook training set is defined based on the determination that each digital asset in the codebook training set has the content.

9. A computer-implemented method for optimizing codebook generation latencies, the method comprising:
selecting, by a processing engine, a set of digital assets from a plurality of digital assets based at least in part on a determination that each digital asset in the set of digital assets has a content and at least one asset characteristic that is different, wherein the at least one asset characteristic includes a bitrate or a resolution; and
generating, by the processing engine, a single codebook that is based on vectors mapped from each digital asset in the selected set of digital assets, wherein the single codebook is generated to encode digital assets having the content.

10. The method of claim 9, further comprising:
decoding, by the processing engine with the generated single codebook, at least an encoded portion of at least a first digital asset determined to have the content.

11. The method of claim 10, wherein at least the encoded portion of at least the first digital asset is decoded based at least in part on a received request to access the first digital asset.

12. The method of claim 10, wherein at least the first digital asset is encoded with the generated single codebook.

* * * * *